Feb. 13, 1968   M. J. WILSON ETAL   3,368,521
VEHICLE SAFETY-SPACED TRAILING-SIGNAL DEVICE
Filed March 3, 1966
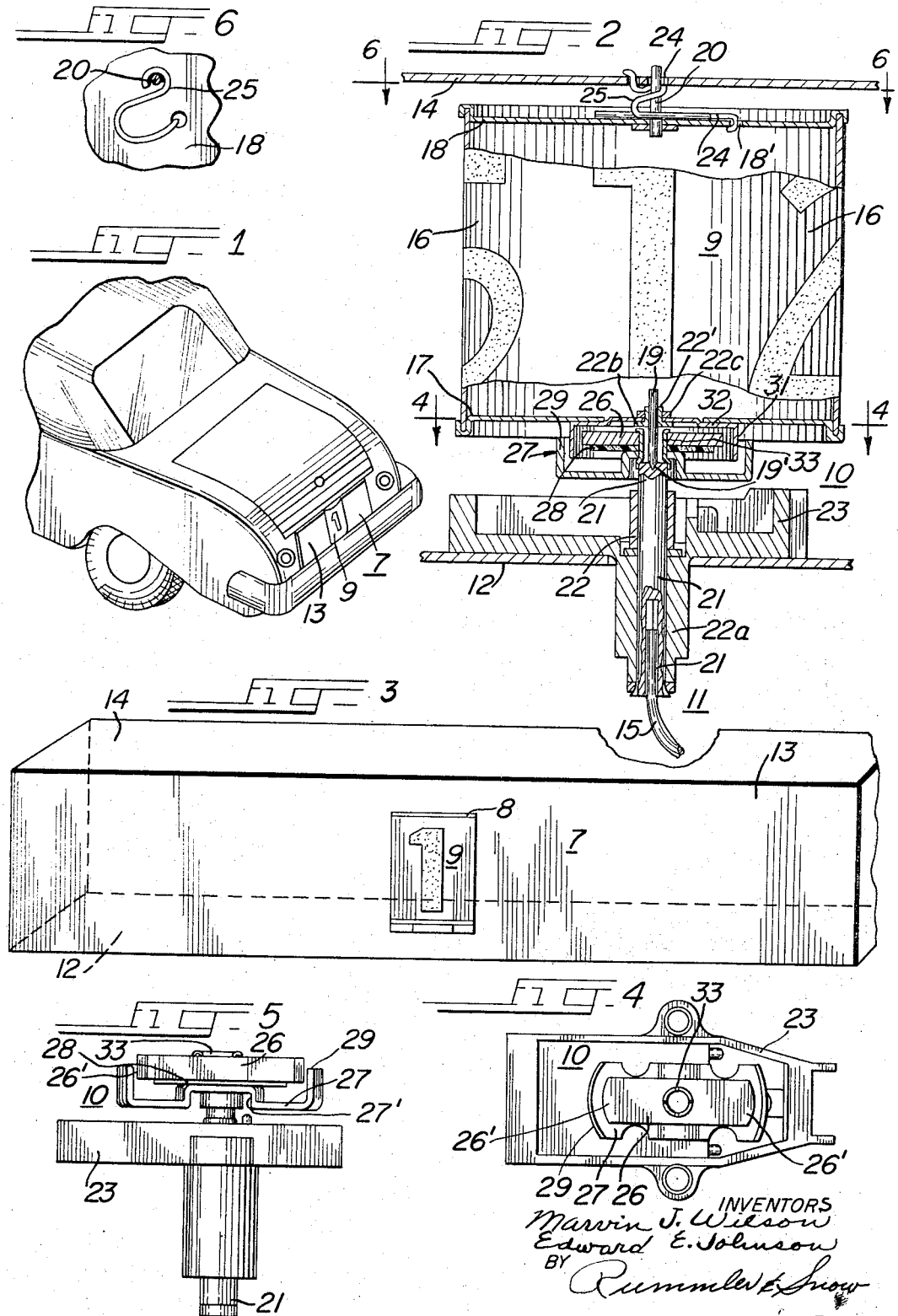

United States Patent Office 3,368,521
Patented Feb. 13, 1968

3,368,521
VEHICLE SAFETY-SPACED TRAILING-
SIGNAL DEVICE
Marvin J. Wilson, 5145 N. Octavia, Skokie, Ill. 60076,
and Edward E. Johnson, 7348 Ridge Ave., Chicago, Ill.
60645
Filed Mar. 3, 1966, Ser. No. 531,576
1 Claim. (Cl. 116—116)

ABSTRACT OF THE DISCLOSURE

The essential concept of this invention involves a rotating element bearing on its face a series of numerals and actuated by means associated with a moving part of a vehicle to effect the selective exposure of one numeral at a time, through a sight-opening in a housing member, and in direct proportion to the speed of the vehicle, to indicate the safe-driving distance that a trailing vehicle should be from the vehicle having the unit installed on the rear thereof.

---

This invention relates to a device for location on the rear of a motor vehicle to indicate a safely-spaced driving distance for a directly-following vehicle.

It has been established with a high degree of certainty that the ratio of collision accidents on the highways is proportionate to the spacing between vehicles. That ratio currently is indicated as one car length for every ten miles per hour of driving speed.

The main objects of this invention are; to provide an improved device for indicating to the driver of a vehicle a safe-trailing distance from a preceding vehicle; to provide a device of this kind, the functioning of which is regulated by the speed of the vehicle whereon this device is mounted; to provide such a device controlled by a connection thereof to the speedometer cable of the vehicle whereto the device is mounted; to provide a safe-distance indicator of this kind the operation of which is effected by a magnetic field acting against a predetermined counteracting force; and to provide a device of this kind of such simple and practical construction as to make the manufacturing and marketing thereof relatively economical, its attachment to a vehicle quite facile and practical, and the results from its use highly gratifying.

In the adaptation shown in the accompanying drawing;

FIG. 1 is a miniature view of the rear end of a conventional passenger vehicle wherein is arranged a space-trailing signal-device constructed in accordance with this invention;

FIG. 2 is an enlarged, vertical-sectional view of a space-trailing signal-device constructed in accordance with this invention as shown in FIG. 1;

FIG. 3 is an enlarged exterior face view of that portion of the device, shown in FIG. 1 through which a signal index is exposed;

FIG. 4 is a plan view of the signal device taken on the plane of the line 4—4 of FIG. 2; with parts omitted showing the magnet armature arrangement;

FIG. 5 is a side elevational view of the magnet-armature shown in FIG. 4; and

FIG. 6 is a fragmentary plan view of the biasing-spring connection shown in the upper part of FIG. 2.

A vehicle-signaling device embodying the foregoing concept comprises a housing 7, in the form of an elongated rectangular box, enclosing a numeral-bearing element 9 secured to a rotor 10 with a connection 11 including a speedometer cable 15 which in turn is connected to the speedometer control of the vehicle (not shown).

The housing 7 which is mounted on the rear of the vehicle, has, as shown in FIG. 3, a rear wall 13 and forwardly extending base and top walls 12 and 14, respectively. The rear wall 13 has a sight opening 8 for selective exposure of a series of numerals on the rotatable element 9, as will be explained presently. The precise size and contour of this housing 7 would be determined by where, on the vehicle, the device is to be mounted. As herein shown, the mounting is on the rear of the vehicle below the trunk door for use in signaling the driver of a trailing vehicle.

The herein illustrated location of the device is such that the rear wall 13 of the housing 7 is disposed flush with the rear wall of the vehicle body above the bumper with the sight-opening 8 clearly visible to the driver of a trailing vehicle. The opening 8, in the rear wall 13, is dimensioned so as to expose, one at a time, the numerals on the numeral-bearing or rotating element 9.

The element 9, as hereinshown, comprises a cylindrical shall 16 interposed between and secured to a pair of axially spaced disk-shaped ends 17 and 18. The element 9 is rotatatively supported by oppositely-extending pintles 19 and 20. The pintle 19 is journaled at 19′ in a seat in the upper end of a rotary stem 21 and is held in bushing 22′ fixed on the lower disk 17. The lower end of stem 21 is journaled in the cylindrical boss 22a of a bracket 23. The upper portion of stem 21 is journaled in bushing 22 secured to bracket 23. The pintle 20 suitably anchored at its lower end of the disk 18, extends upwardly through a bearing 24 in the top wall 14 of the housing 7. The lower end of the bushing 22′ is provided with an integrally formed circular flange 22b and the upper end of the bushing is threaded to receive the anti-friction nut 22c whereby the upwardly offset portion of the cup 32 is fixedly secured therebetween. It should be understood that a single shaft could be substituted for the pintles 19–20. An S-shaped pretensioned spring 25 (FIGS. 2 and 6) has one end embracing the pintle 20 and fixed to the top wall 14 above the disk 18 and the other end hooked into an aperture 18′ in the lisk 18. This serves to bias the element 9 toward a fully-retracted position thereby exposing, through the opening 8, a blank portion of the element 9.

The rotor 10 is of the magnetic type comprising an axially-arranged magnet 26 and armature 17 having insulation interposed therebetween. The magnet 26 is a relatively flat piece of iron of elongated contour with arcute shaped ends 26′ fixed medially to a hollow cylindrical sleeve 33. The armature 27, likewise is an elongated piece of iron with arcuate-shaped, upstanding end flanges 29 concentric with the magnet ends 26′ and is provided with an upwardly extending offset portion 27′ medially apertured for anchoring to the sleeve 33 below the magnet 26 and insulator 28. Such contoured magnet 26 and armature 27 would be comparable to medial portions of disks of diameters equivalent to the arcuate ends of the respective magnet and armature. Interposed between the ends of the magnet 26 and the armature 27 is the downwardly extending rim 31 of an inverted aluminum cup 32 secured concentrically to the bottom of the lower disk 17 of the element 9.

As shown in FIG. 2, the sleeve 33 has both of its distal ends flared outwardly to snugly hold the magnet 26 insulation member 28 and armature 27 in superimposed position and the lower end of the sleeve 33 is frictionally seated on the upper end of the stem 21. Thus all the above are rotatable as a unit when the cable 15 is rotated by the speedometer control.

Such a device operates in the following manner:

The cable 15 associated with the vehicle speedometer control, will rotate the stem 21 which, obviously, has to be against the tension of the spring 25. The rotation of the stem 21 is in a counter-clockwise direction. The resulting rotation of the magnet 26 and the armature 27 thus will rotate the element 9, because the magnetic forces acting on the armature will rotate or "drag" the aluminum rim 31 of the element 9 in direct proportion to the rotation of the magnet and armature by the cable 15 which rotates in direct proportion to the vehicle speed and against the spring 25. The resulting numeral that appears through the sight opening 8 constitutes a signal as to the proper number of car-lengths a trailing vehicle should be, from the vehicle ahead and containing this device in the interests of safe driving.

Although but one specific embodiment of this invention is herein shown and described, it will be understood that numerous details of the construction shown may be altered or omitted without departing from the spirit of the invention as defined by the following claim.

We claim:

1. A visual signal device mounted on the rear of a motor vehicle in the line of vision of the driver of a trailing vehicle to indicate to the latter a safe trailing distance, comprising,
   (A) a housing fixedly secured to the rear of a vehicle, said housing including
      (1) a rear wall having a sight opening substantially normal to said line of vision and being exposed thereto,
      (2) a base wall extending from said rear wall inwardly towards the front of said vehicle,
      (3) a top wall extending from said rear wall substantially parallel with, and spaced from said base wall,
   (B) a rotary element disposed between said base wall and said top wall and rotatable about an axis substantially parallel with said rear wall and substantilly normal to said base wall and said top wall, said rotary element including
      (1) a cylindrical shell disposed coaxially with said axis and bearing on its outer face a series of indicia arranged circumferentially, each of said indicia being adapted to be individually exposed through said sight opening,
      (2) a pair of axially spaced parallel discs closing off said shell at either end, one of said discs being disposed adjacent said top wall and the other of said discs being disposed adjacent said base wall,
   (C) a rotary stem operatively connected to the vehicle speedometer cable and rotated thereby, said stem disposed coaxially with said axis and secured axially fixedly to said base wall,
   (D) pintle means disposed coaxially with said axis and secured to each of said discs, said pintle means projecting in opposite directions beyond of, and outwardly from said discs, one end of said pintle means operatively engaging the terminus of said stem, the other end of said pintle means being journaled in said top wall,
   (E) spring means connectively disposed between one of said walls and one of said discs, said spring means urging said rotary member into a predetermined zero position,
   (F) a magnet assembly fixedly secured to said stem and rotatable as a unit therewith, said magnet assembly including
      (1) a radially extending permanent magnet and
      (2) a radially extending armature axially spaced from said magnet and having at its ends axially extending flanges directed towards said magnet,
   (G) a non-magnetic rim secured concentrically to said disc disposed adjacent said base wall, said rim extending axially into a radial space between said magnet and said axially extending flanges of said armature, said magnet assembly, when rotated, applying a torque to said rim to rotate said rotary element against said spring means to an extent proportionate to the rotary speed of said stem.

References Cited

UNITED STATES PATENTS

| | | | |
|---|---|---|---|
| 1,209,427 | 12/1916 | Goldsworthy | 116—116 |
| 1,384,809 | 7/1921 | Smith | 116—116 |
| 1,482,595 | 2/1924 | Berge | 73—519 |
| 1,597,217 | 8/1926 | Tilton | 73—499 |
| 2,141,445 | 12/1938 | Paul | 73—519 |
| 2,579,806 | 12/1951 | Dvorkin | 116—57 |
| 2,679,229 | 5/1954 | Roderman | 116—116 |
| 2,845,721 | 8/1958 | Adler | 116—116 |
| 3,111,037 | 11/1963 | Wallis | 73—519 |
| 3,159,135 | 12/1964 | Miles | 116—57 |

LOUIS J. CAPOZI, *Primary Examiner.*